US012046239B2

(12) United States Patent
Sharifi et al.

(10) Patent No.: US 12,046,239 B2
(45) Date of Patent: Jul. 23, 2024

(54) SUGGESTING AN ALTERNATIVE INTERFACE WHEN ENVIRONMENTAL INTERFERENCE IS EXPECTED TO INHIBIT CERTAIN AUTOMATED ASSISTANT INTERACTIONS

(71) Applicant: GOOGLE LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/200,518

(22) Filed: May 22, 2023

(65) Prior Publication Data

US 2023/0298583 A1 Sep. 21, 2023

Related U.S. Application Data

(63) Continuation of application No. 17/100,013, filed on Nov. 20, 2020, now Pat. No. 11,657,817.
(Continued)

(51) Int. Cl.
*G10L 15/22* (2006.01)
*G06F 3/04886* (2022.01)
(Continued)

(52) U.S. Cl.
CPC .......... *G10L 15/22* (2013.01); *G06F 3/04886* (2013.01); *G06F 3/167* (2013.01);
(Continued)

(58) Field of Classification Search
CPC ... G10L 15/22; G10L 25/78; G10L 2015/223; G10L 2015/228; G10L 25/48; G06F 3/04886; G06F 3/167
See application file for complete search history.

(56) References Cited

U.S. PATENT DOCUMENTS 10,504,509 B2  12/2019  Aggarwal et al.
2004/0054819 A1*  3/2004  Daimoto ................. G06F 3/038
                                                         710/1
(Continued)

FOREIGN PATENT DOCUMENTS

JP  2004054080   2/2004
JP  2005352397  12/2005
(Continued)

OTHER PUBLICATIONS

European Patent Office; Communication pursuant to Article 94(3) EPC issued in Application No. 21811556.6; 6 pages; dated Dec. 1, 2023.
(Continued)

*Primary Examiner* — Daniel C Washburn
*Assistant Examiner* — Athar N Pasha
(74) *Attorney, Agent, or Firm* — Gray Ice Higdon (57) ABSTRACT

Implementations set forth relate to suggesting an alternate interface modality when an automated assistant and/or a user is expected to not understand a particular interaction between the user and the automated assistant. In some instances, the automated assistant can pre-emptively determine that a forthcoming and/or ongoing interaction between a user and an automated assistant may experience interference. Based on this determination, the automated assistant can provide an indication that the interaction may not be successful and/or that the user should interact with the automated assistant through a different modality. For example, the automated assistant can render a keyboard interface at a portable computing device when the automated assistant determines that an audio interface of the portable computing device is experiencing interference.

20 Claims, 5 Drawing Sheets

Related U.S. Application Data (60) Provisional application No. 63/092,943, filed on Oct. 16, 2020.

(51) Int. Cl.
*G06F 3/16* (2006.01)
*G10L 25/78* (2013.01)

(52) U.S. Cl.
CPC ........ *G10L 25/78* (2013.01); *G10L 2015/223* (2013.01); *G10L 2015/228* (2013.01)

(56) References Cited

U.S. PATENT DOCUMENTS

| | | |
|---|---|---|
| 2009/0319266 A1 | 12/2009 | Brown et al. |
| 2014/0035823 A1* | 2/2014 | Khoe ................. G06F 3/04886 345/171 |
| 2014/0122057 A1* | 5/2014 | Chelba ................. G06F 3/0418 704/9 |
| 2014/0222430 A1 | 8/2014 | Rao |
| 2018/0218732 A1 | 8/2018 | Grant et al. |
| 2019/0130901 A1 | 5/2019 | Kato et al. |
| 2019/0391828 A1 | 12/2019 | Tokuhashi |
| 2020/0312336 A1* | 10/2020 | Kang ..................... G06N 3/045 |
| 2021/0068714 A1 | 3/2021 | Crowley et al. |
| 2021/0097163 A1 | 4/2021 | Efremov |
| 2022/0122599 A1 | 4/2022 | Sharifi et al. |

FOREIGN PATENT DOCUMENTS

| | | |
|---|---|---|
| JP | 2010153956 | 7/2010 |
| JP | 2012063921 | 3/2012 |
| JP | 2017102822 | 6/2017 |
| JP | 2018067100 | 4/2018 |
| JP | 2020003925 | 1/2020 |

OTHER PUBLICATIONS

European Patent Office; International Search Report and Written Opinion of PCT Application No. PCT/US2021/054582; 12 pages; dated Jan. 31, 2022.

Japanese Patent Office; Notice of Reasons for Rejection issued in Application No. 2022-569163; 7 pages; dated Feb. 19, 2024.

* cited by examiner

SUGGESTING AN ALTERNATIVE INTERFACE WHEN ENVIRONMENTAL INTERFERENCE IS EXPECTED TO INHIBIT CERTAIN AUTOMATED ASSISTANT INTERACTIONS

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e., utterances) which may in some cases be converted into text and then processed, and/or by providing textual (e.g., typed) natural language input.

Users that interact with automated assistants may inevitably invoke their respective automated assistant under circumstances in which a modality for receiving user input experiences interference. Such circumstances can include crowded public venues and/or other areas where background noise is apparent. An input modality that is affected by the interference may therefore not be a reliable interface for the automated assistant at that time. As a result, a user that provides an input to an interface that is temporarily unreliable may have to repeat their input. In some instances, when the user is intending to control an automated assistant with their input, the automated assistant may request that the user repeat the input and/or initialize performance of an incorrect action. Repeating inputs and/or performing incorrect actions can result in a wasting of computational resources—given that the repeated inputs and/or unintended actions would be processed at a client computing device and/or communicated over a network to a server.

SUMMARY

Implementations set forth herein relate to an automated assistant that can determine whether an ongoing or anticipated interaction between a user and an automated assistant, via a particular interface, is expected to be affected by interference. When the automated assistant determines that the interaction at the particular interface is determined to be affected by the interference, the automated assistant can provide an indication that the user should interact with the automated assistant via a separate interface. In this way, the automated assistant can preserve computational resources by reducing a quantity of times that a user would have to repeat an input that may have been affected by some amount of environmental interference. Furthermore, this can reduce a quantity of instances in which the automated assistant initializes an incorrect action, as a result of an interaction being affected by certain interferences.

In some instances, a user can be located in an environment where there is some amount of background noise caused by interactions of other persons in the environment. During this time, the user can be holding a portable computing device in expectation of invoking their automated assistant to answer a particular query (e.g., "Assistant, what time am I meeting Joe tomorrow?"). In some implementations, prior to the user providing an input to their automated assistant, or simultaneous with the user providing the input to the automated assistant, the automated assistant can determine whether the input will be, or is being, interrupted by the background noise. For example, when the user input is embodied in a spoken utterance, the background noise caused by the other persons can be captured in audio that also captures the spoken utterance. When the automated assistant determines that the input is expected to be affected by the background noise, and/or other interference, the automated assistant can cause an indication to be rendered to the user. The indication can operate to warn the user that their input may not be sufficiently received by the automated assistant and/or that the user may have another input modality available to provide the input. For example, in some implementations, the indication can be a rendering of a keyboard interface, which can be employed by the user to type an input to the automated assistant instead of speaking to the automated assistant.

In some implementations, one or more features of the environment of the user can be characterized by data that is used to determine whether or not the one or more features of the environment will affect user input to a certain degree. The data can be processed in order to generate one or more scores, which can be compared to a threshold that, when satisfied, indicates that a user input is expected to be affected by one or more features of the environment. For example, a score can be based on a quantity of persons within the environment, a quantity of persons speaking within the environment, one or more prior instances in which the user engaged with the automated assistant in a similar environment, a type of background noise, a volume level of background noise, one or more images of the environment, and/or any other data that can be used to characterize an environment.

In some implementations, the score and/or an additional score can be based on an availability of a separate modality for interacting with the automated assistant. For example, when a user is in an environment in which the automated assistant is accessible via a standalone speaker device that does not include a graphical user interface, the additional score can be generated to reflect a limited availability of any other interface (e.g., a keyboard interface rendered at a graphical user interface). Alternatively, when the user is in another environment in which the automated assistant is accessible via a standalone speaker device and a mobile computing device that is in a pocket of the user, the additional score can be generated to reflect an abundance of interfaces in which the user can interact with the automated assistant. In some implementations, the additional score can be generated to reflect an availability of an automated assistant interface that is not expected to experience interference within an environment. Based on an interference score for the environment, and optionally an interface availability score, the automated assistant can determine whether or not to provide an indication that another interface is available and/or that a particular type of input is expected to experience interference. In some implementations, one or more scores can be updated over time based on environmental changes and/or changes in availability of certain automated assistant interfaces.

In some implementations, one or more scores can be based on processing data from one or more different sources using one or more trained machine learning models. The trained machine learning models can be trained using training data that is based on prior instances in which one or more different types of interferences affected, and/or did not affect, an interaction between a user and an automated assistant. For example, one or more sources of data can characterize an environment in which a user is present, and the data can be processed using one or more trained machine learning models in order to generate an embedding. The embedding can be compared to other embeddings in latent space in order to determine whether the environment is exhibiting an interference that will affect an interaction between a user and an automated assistant. Alternatively, or additionally, one or more trained machine learning models can be used for classifying and/or otherwise determining a probability of a user being understood. In some implementations, a distance from the embedding to another embedding in latent space can be compared to a threshold or another distance in order to determine whether to suggest that the user should interface with the automated assistant via a particular interface modality. For example, the comparison of embeddings in latent space, and/or via a heuristic method, can result in one or more interfaces being indicated as affected by interference and/or one or more other interfaces being indicated as less affected by the interference.

The above description is provided as an overview of some implementations of the present disclosure. Further description of those implementations, and other implementations, are described in more detail below.

Other implementations may include a non-transitory computer-readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
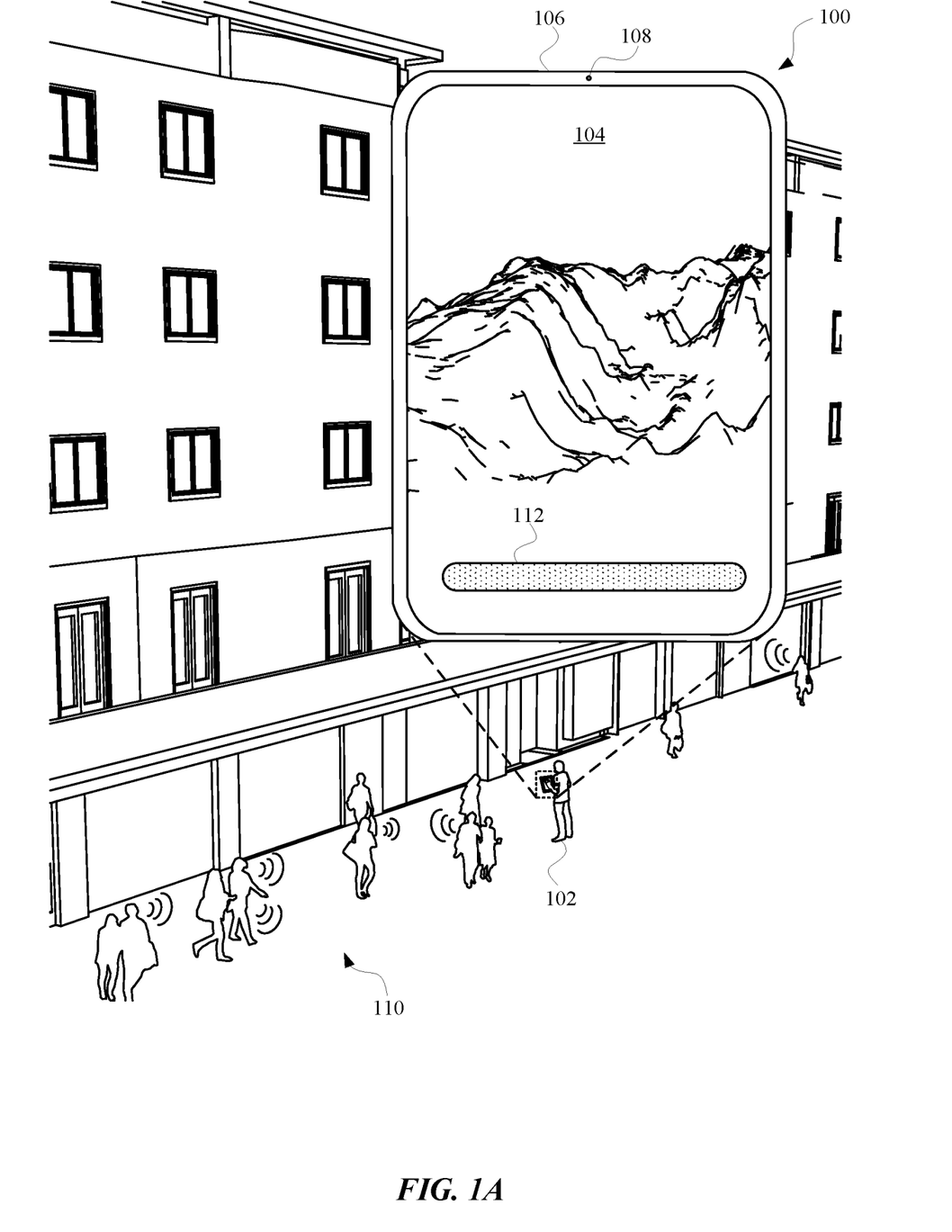
FIG. 1A and FIG. 1B illustrate views of a user receiving a suggestion to type an input to an automated assistant instead of speaking an input in an environment that may interfere with spoken inputs.
Figure 1B:
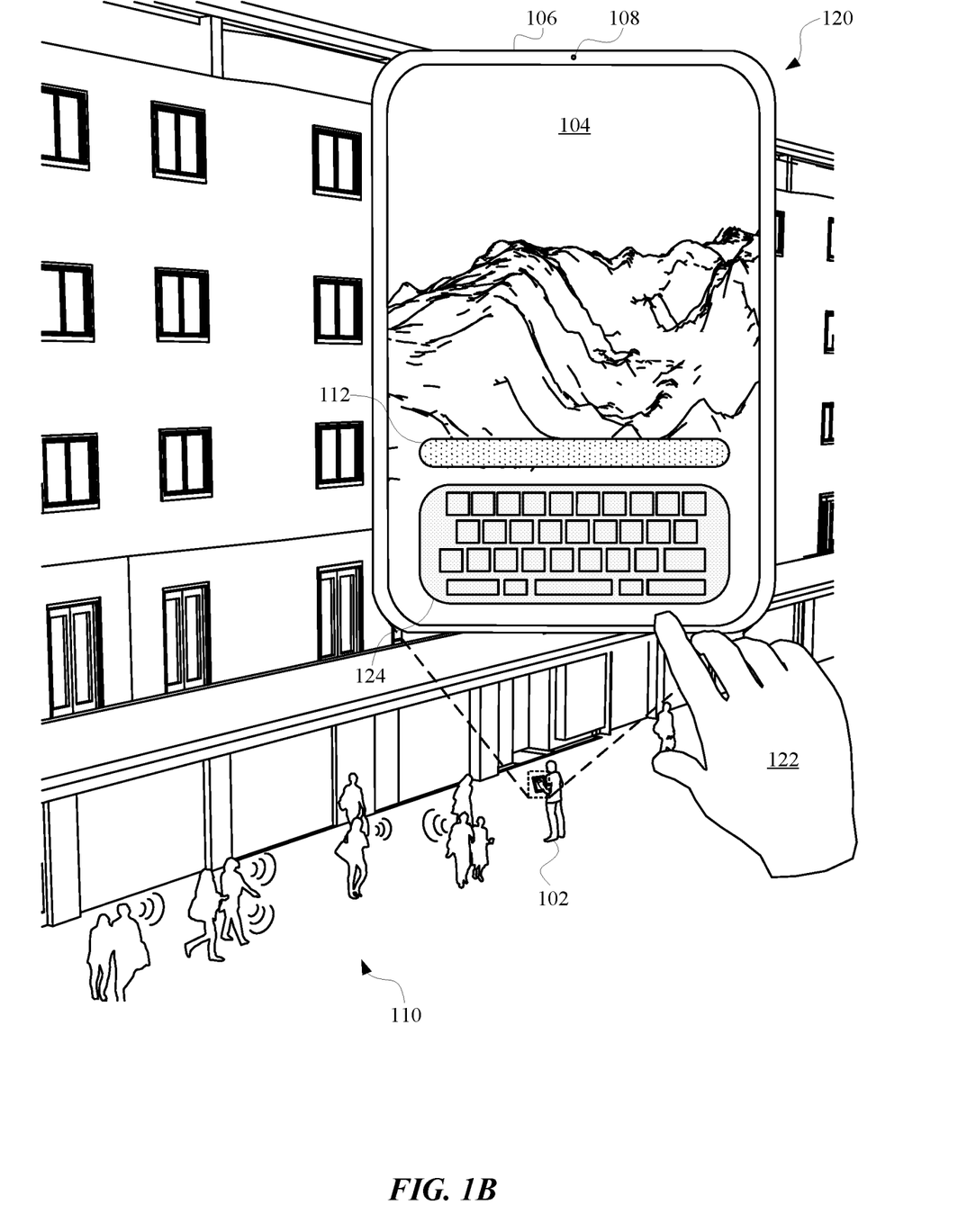

FIG. 1A and FIG. 1B illustrate a view 100 and a view 120, respectively, of a user 102 receiving a suggestion to type an input to an automated assistant instead of speaking an input in an environment 110 that may interfere with spoken inputs. For example, the user 102 can be in an environment 110, such as outside their apartment building, and have a query that they would like to ask their automated assistant. In order to access the automated assistant, the user 102 can have a computing device 106 that allows the user 102 to interact with the automated assistant via one or more interfaces. For example, the computing device 106 can include a display interface 104, which can be touch-enabled display panel, and an audio interface 108, which can include a speaker and/or a microphone. In some implementations, the computing device 106 can also include a camera for providing another interface with which to interact with the automated assistant.

In some implementations, and with prior permission from the user 102, the automated assistant can determine whether one or more features of the environment 110 will affect an interaction between the user 102 and the automated assistant. For example, the automated assistant can determine that the user 102 is on a crowded sidewalk based on audio data and/or image data that is available to the computing device 106. In some implementations, data from one or more sources can be processed in order to determine whether an input to a particular interface of the computing device 106 would experience interference from the environment 110 and/or other sources. Based on this processing, the automated assistant can elect to provide an indication to the user 102 that an input to a particular interface will experience interference while in the environment 110. For example, initially the display interface 104 can be void of any indication that a particular interface will be affected by interference, such as background noise (e.g., multiple people talking, as indicated in FIG. 1A and FIG. 1B) and/or other interference. However, as provided in view 120 of FIG. 1B, based on determining that a particular interface will be affected by certain interference, the automated assistant and/or other application can cause a keyboard 124 to be rendered at the display interface 104.

In some implementations, one or more characteristics of the keyboard 124 can be at least partially based on a degree to which interference is expected to affect an input to a particular interface (e.g., a microphone) of the computing device 106. For example, a size of the keyboard 124 can be adjusted according to a degree to which the interference is expected to affect an input to the particular interface. In some implementations, when interference is not expected to affect a spoken input to the automated assistant, the automated assistant can optionally cause an input field 112 to be rendered at the display interface 104. However, when interference is expected to affect an input to the automated assistant, the automated assistant can cause the keyboard 124 to be rendered at the display interface 104, while either keeping or removing the input field 112 from the display interface 104. This can allow the user 102 to use their hand 122 to type inputs to the automated assistant, without risking having a spoken input being affected by audible interference.

Figure 2:
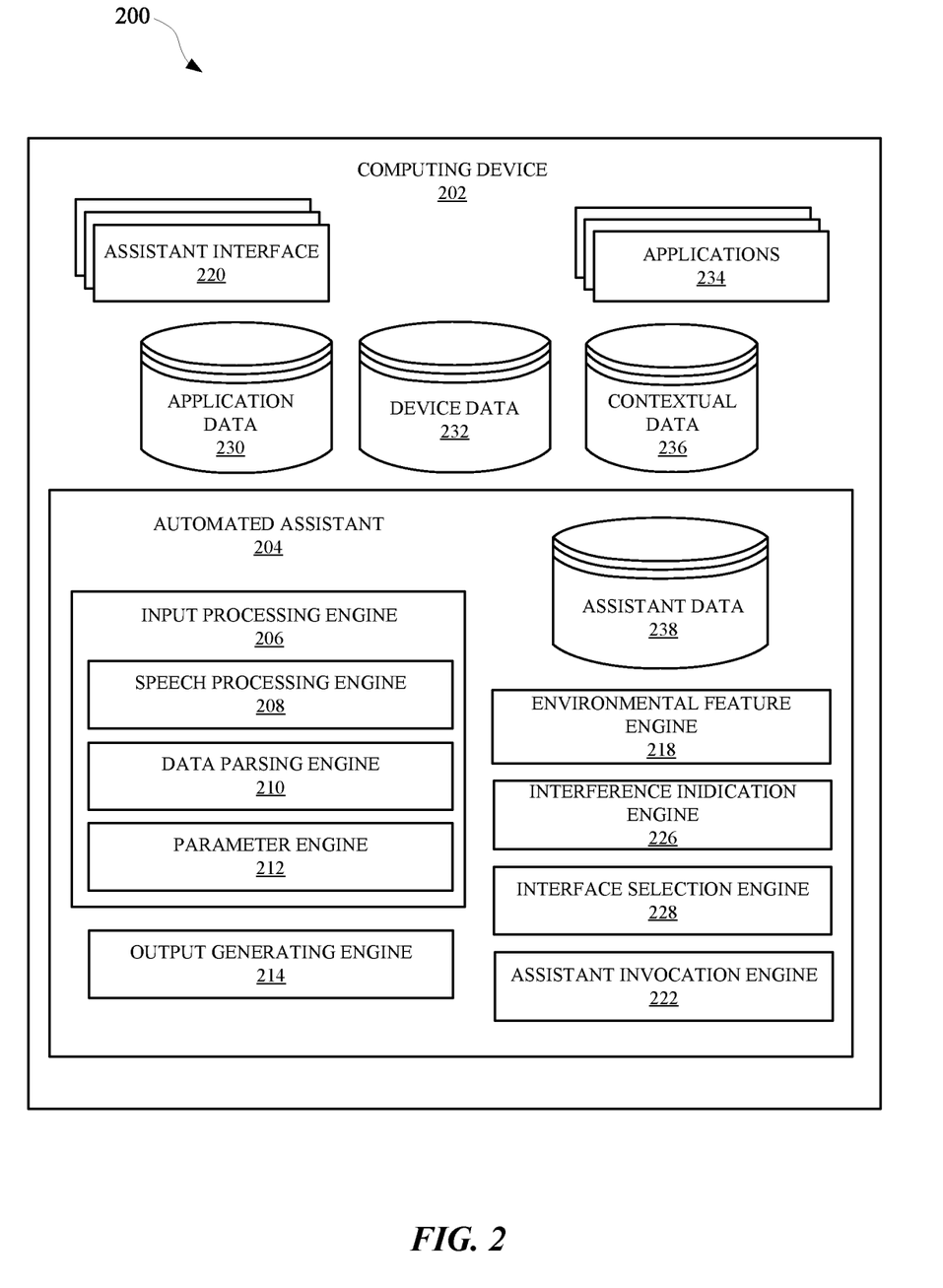
FIG. 2 illustrates a system for suggesting an alternate interface modality when an automated assistant and/or a user is expected to not understand a particular interaction between the user and the automated assistant.

FIG. 2 illustrates a system 200 for suggesting an alternate interface modality when an automated assistant and/or a user is expected to not understand a particular interaction between the user and the automated assistant. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to explicitly speak an invocation phrase to invoke the automated assistant 204, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant.

When the one or more trained machine learning models are trained according to these instances of training data, the assistant invocation engine 222 can cause the automated assistant 204 to detect, or limit detecting, spoken invocation phrases from a user based on features of a context and/or an environment. Additionally, or alternatively, the assistant invocation engine 222 can cause the automated assistant 204 to detect, or limit detecting for one or more assistant commands from a user based on features of a context and/or an environment. In some implementations, the assistant invocation engine 222 can be disabled or limited based on the computing device 202 detecting an assistant suppressing output from another computing device. In this way, when the computing device 202 is detecting an assistant suppressing output, the automated assistant 204 will not be invoked based on contextual data 236—which would otherwise cause the automated assistant 204 to be invoked if the assistant suppressing output was not being detected.

In some implementations, the automated assistant 204 can include an environmental feature engine 218, which can detect one or more features of an environment in which the computing device 202 and/or another computing device are operating. The environmental feature engine 218 can process data characterizing the one or more features in order to determine whether an interaction between the user and the automated assistant 204 will be affected by the environment. This determination can be based on one or more heuristic processes and/or one or more trained machine learning models, which can be trained based on prior instances in which one or more users interacted with an automated assistant in a similar environment. For example, data characterizing prior instances in which users interacted with an automated assistant in a crowded environment can be used to identify a threshold for an interference score. The interference score can be generated for a particular environment using one or more trained machine learning models. When the interference score threshold is satisfied by a particular interference score, the environmental feature engine 218 can communicate with an interference indication engine 226 of the automated assistant 204.

The interference indication engine 226 can be employed by the automated assistant 204 to provide an indication to a user that an interaction between the user and the automated assistant 204 may be affected by one or more features of the environment they are in. In some implementations, the type of indication that is provided to a user can be based on one or more scores generated by the environmental feature engine 218. For instance, when a score is generated for indicating that audio interference will affect an audio interface, the interference indication engine 226 can cause a visual indication to be rendered for the user. In some implementations, characteristics of an indication can also be selected by the interference indication engine 226. For example, the interference indication engine 226 can cause a size, shape, brightness, content, and/or other characteristic of an indication to be adjusted according to a degree of interference expected to affect an interaction between a user and an automated assistant 204.

In some implementations, the automated assistant 204 can include an interface selection engine 228, which can select an interface to promote to a user when interference is expected to affect a different interface. For example, when the computing device 202 is determined to be experiencing an amount of glare that would make typing at a touch interface to be difficult, the interface selection engine 228 can score the touch interface below other available interfaces. In some instances, the interface selection engine 228 can designate the touch interface as a less optimal interface in certain environments than, for example, an audio interface. In some implementations, the interference indication engine 226 can be notified of the rankings from the interface selection engine 228 and generate an indication that identifies a most optimal interface for a particular environment. For instance, an indication provided by the interference indication engine 226 can include a rendering of a keyboard that the user can provide touch inputs to in order to type an input directly to the automated assistant.

Figure 3:
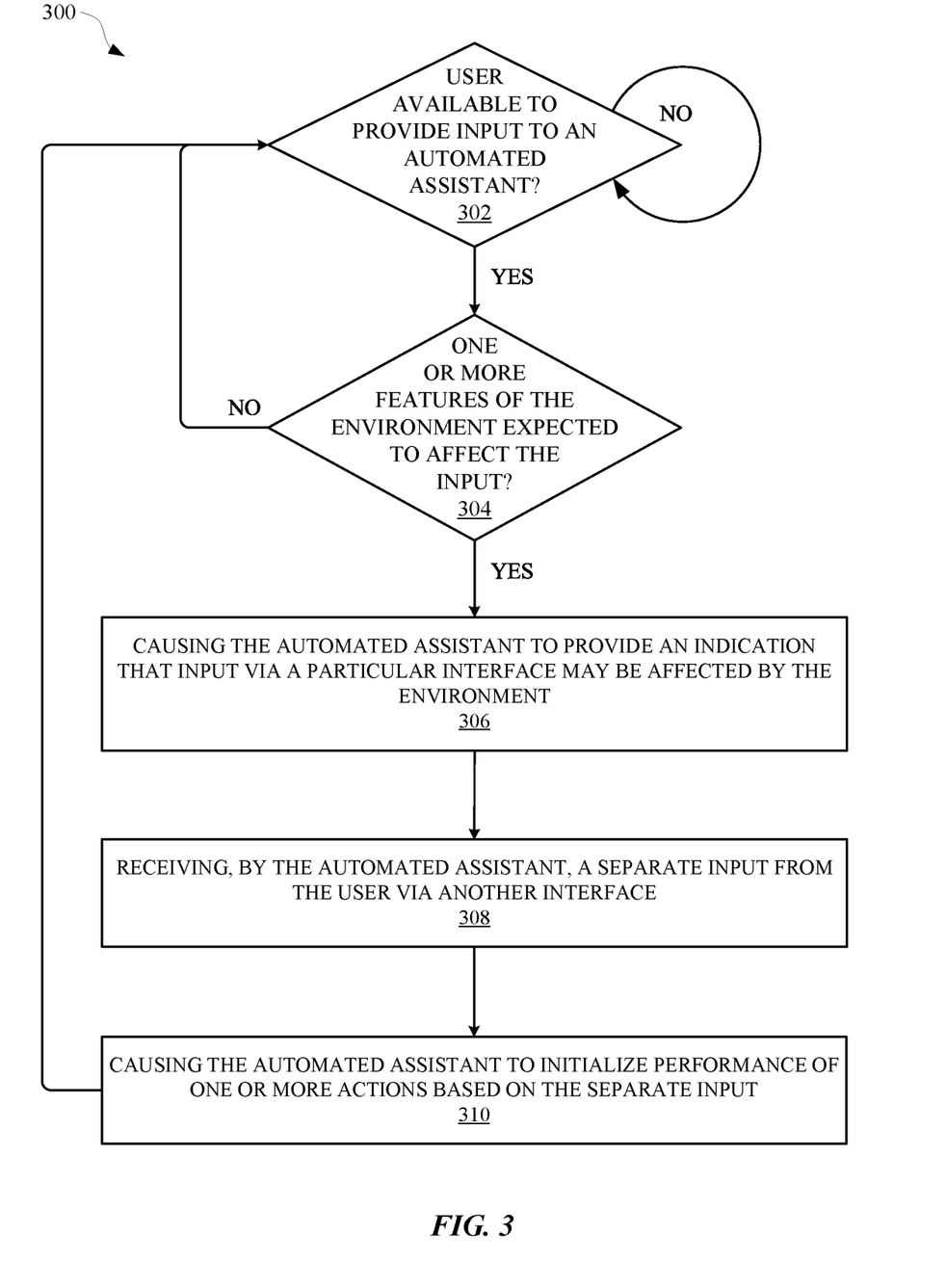
FIG. 3 illustrates a method for providing an indication of whether a particular input to an automated assistant will be affected by interference in an environment, and providing a separate interface for providing input to the automated assistant.

FIG. 3 illustrates a method 300 for providing an indication of whether a particular input to an automated assistant will be affected by interference in an environment, and providing a separate interface for providing input to the automated assistant. The method 300 can be performed by one or more computing devices, applications, and/or any other apparatus or module that can be associated with an automated assistant. The method 300 can include an operation 302 of determining whether a user is available for providing input to the automated assistant. In some implementations, a determination of whether the user is available can be based on data from one or more sensors and/or any other interfaces of one or more computing devices. For example, the automated assistant can determine that one or more users are within a threshold distance of an automated assistant interface based on audio data and/or image data. When the automated assistant determines that a user is available to provide an input to the automated assistant, the method 300 can proceed to an operation 304. Otherwise, the automated assistant can continue to determine whether a user is available to provide input to the automated assistant.

The operation 304 can include determining whether one or more features of the environment are expected to affect an input from the user. In some implementations, the one or more features of the environment can include audio characteristics of the environment. The audio characteristics can include a quantity of persons that are speaking, a source of a particular sound, a volume and/or frequency of a particular sound, ambient sound, overall volume level, a distance of a source of the sound to the particular interface, and/or any other audio characteristic that can interfere with an input to a computing device. In some implementations, the one or more features of the environment can include objects, persons, location, available power, weather, motion, lighting, distance between certain objects, layout of an area, temperature, and/or any other feature of an environment that can affect an interaction between a user and an automated assistant. In some implementations, the one or more features of the environment can be determined and used to generate a score. The automated assistant can determine whether the score satisfies one or more different thresholds. Alternatively, or additionally, one or more different scores can be generated for each respective interface of a computing device that is in the environment. When a score for a particular interface does not satisfy a threshold for the particular interface, the automated assistant can provide an indication that the particular interface may experience interference during an interaction between the user and the automated assistant. For example, a score for an audio interface can fail to satisfy a threshold for the audio interface and, as a result, the automated assistant can cause a keyboard interface to be rendered at the computing device.

When the automated assistant determines that one or more features of the environment are expected to affect an interaction between the user and the automated assistant, the method 300 can proceed from operation 304 to an operation 306. Otherwise, the automated assistant can continue to determine whether a user has provided an input to the particular interface, or another interface, in furtherance of interacting with the automated assistant. The operation 306 can include causing the automated assistant to provide an indication that an input that is provided, or is being provided, via a particular interface may be affected by the environment. In some implementations, the indication can be provided via an audio interface, graphical interface, haptic interface, wireless interface, and/or any other interface that can be used to provide an indication to a user. In some implementations, when the computing device includes a touch display panel, the indication can be rendered at a keyboard interface at the touch display panel. In this way, when the user is about to provide a spoken utterance that is determined to be affected by interference within an environment, the user can see the keyboard interface and elect to provide a touch input to the touch display panel instead of the spoken utterance.

The method 300 can proceed from operation 306 to an optional operation 308, which can include receiving, by the automated assistant, a separate input from the user via another interface (i.e., another interface that is separate from the particular interface that is determined to be affected by interference within the environment). For example, instead of the user providing a spoken utterance such as, "Assistant, good morning," in order to initialize performance of a "good morning" routine, the user can type a shorter input such as "good morning" into the keyboard interface as an input to the automated assistant. The method 300 can proceed from operation 308 to an optional operation 310, which can include causing the automated assistant to initialize performance one or more actions based on the separate input. For example, the separate input can include natural language content that is typed by the user using the keyboard interface that was rendered at the operation 306. The natural language content can be, "good morning," which can cause the automated assistant to perform one or more actions in furtherance of completing a "good morning" routine (e.g., reading calendar entries for the day, turning on lights in the house, playing relaxing music). By providing an indication regarding whether a spoken input, or other type of input, is likely to experience interference, the automated assistant can reduce a quantity of misinterpreted inputs from a user. This can preserve computational resources that might otherwise be consumed performing incorrect actions and/or processing duplicate inputs.

Figure 4:
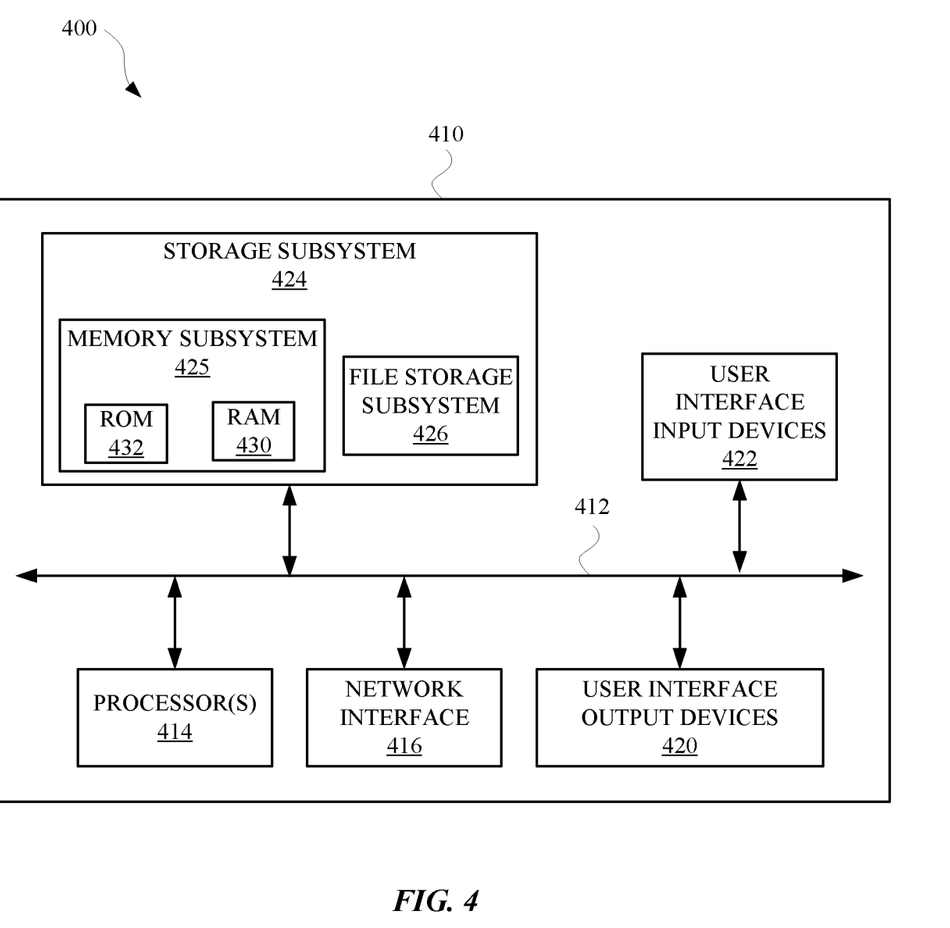
FIG. 4 is a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, computing device 106, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as processing first data that characterizes audio characteristics of an environment in which a computing device is present, wherein the computing device provides access to an automated assistant via one or more interfaces of the computing device. The method can further include an operation of determining, based on the first data, whether the audio characteristics correspond to an interference that is expected to affect an interaction between a user and an automated assistant, wherein the interaction occurs via an audio interface of the one or more interfaces. The method can further include an operation of processing second data that indicates that the user is providing, or is expected to provide, a spoken utterance to the automated assistant in furtherance of the interaction. The method can further include an operation of, when the interference is determined to affect the interaction: causing, based on the first data and the second data, the computing device or another computing device to render a keyboard interface, receiving, at the keyboard interface, a user input in furtherance of the interaction between the user and the automated assistant, and causing, in response to receiving the user input at the keyboard interface, the automated assistant to initialize performance of one or more actions.

In some implementations, the method can further include an operation of, when the interference is determined to not affect the interaction: receiving, via the audio interface, a separate user input in furtherance of the interaction between the user and the automated assistant. In some implementations, determining whether the audio characteristics correspond to the interference that is expected to affect the interaction between the user and the automated assistant includes: determining a quantity of persons that are located within a threshold distance of the one or more interfaces. In some implementations, determining whether the audio characteristics correspond to the interference that is expected to affect the interaction between the user and the automated assistant includes: determining a score that indicates whether the automated assistant is expected to correctly interpret the spoken utterance that the user is providing, or expected to provide, in furtherance of the interaction, wherein the interference is expected to affect the interaction when the score satisfies a threshold.

In some implementations, determining whether the audio characteristics correspond to the interference that is expected to affect the interaction between the user and the automated assistant includes: determining an additional score that characterizes a convenience of accessing the keyboard interface in the environment in which the computing device is present, wherein the rendering of the keyboard interface is further based on the additional score. In some implementations, causing the computing device to render the keyboard interface is performed simultaneously to the user providing the spoken utterance to the automated assistant in furtherance of the interaction. In some implementations, causing the computing device to render the keyboard interface is performed before the user provides the spoken utterance to the automated assistant in furtherance of the interaction.

In other implementations, a method implemented by one or more processors is set forth as including operations such as processing first data that characterizes one or more features of an environment in which a computing device is present, wherein the computing device provides access to an automated assistant via one or more interfaces of the computing device. The method can further include an operation of determining, based on the first data, whether the one or more features correspond to an interference that is expected to affect an interaction between a user and an automated assistant, wherein the interaction occurs via the one or more interfaces of the computing device. The method can further include an operation of processing second data that indicates that the user is providing, or is expected to provide, an input to the automated assistant in furtherance of the interaction. The method can further include an operation of, when the interference is determined to affect the interaction: causing, based on the first data and the second data, the computing device or another computing device to render an indication that the interaction between the user and the automated assistant will be affected by the interference, receiving, at one or more other interfaces of the computing device or the other computing device, a user input in furtherance of the interaction between the user and the automated assistant, and causing, in response to receiving the user input at the one or more other interfaces, the automated assistant to initialize performance of one or more actions.

In some implementations, the method can further include an operation of, when the interference is determined to not affect the interaction: receiving, at the one or more interfaces of the computing device, a separate user input in furtherance of the interaction between the user and the automated assistant. In some implementations, the one or more interfaces include an audio interface, and the indication is rendered at a graphical user interface of the computing device or the other computing device. In some implementations, determining whether the one or more features correspond to the interference that is expected to affect the interaction between the user and the automated assistant includes: determining a quantity of persons that are located within a threshold distance of the one or more interfaces. In some implementations, determining whether the one or more features correspond to the interference that is expected to affect the interaction between the user and the automated assistant includes: determining a quantity of persons that are speaking within a threshold distance of the one or more interfaces.

In some implementations, determining whether the one or more features correspond to the interference that is expected to affect the interaction between the user and the automated assistant includes: determining a score that indicates whether the automated assistant is expected to correctly interpret the input that the user is providing, or expected to provide, in furtherance of the interaction, wherein the interference is expected to affect the interaction when the score satisfies a threshold. In some implementations, determining whether the one or more features correspond to the interference that is expected to affect the interaction between the user and the automated assistant includes: determining an additional score that characterizes a convenience of accessing the one or more other interfaces in the environment in which the computing device is present, wherein the indication is further based on the additional score. In some implementations, causing the computing device to render the indication is performed simultaneously to the user providing the input to the automated assistant in furtherance of the interaction. In some implementations, causing the computing device to render the indication is performed before the user provides the input to the automated assistant in furtherance of the interaction. In some implementations, the one or more interfaces includes a keyboard interface, and the indication includes the keyboard interface that is rendered at a graphical user interface of the computing device. In some implementations, the indication further includes a text field that includes suggested content that is based on content that is embodied in the input and affected by the interference.

In yet other implementations, a method implemented by one or more processors is set forth as including operations such as processing contextual data that characterizes audio characteristics of an environment in which a computing device is present, wherein the computing device provides access to an automated assistant via an audio interface of the computing device. The method can further include an operation of determining, based on processing the contextual data, whether the audio characteristics correspond to an interference that is expected to affect an interaction between a user and an automated assistant, wherein the interaction occurs via the audio interface of the one or more interfaces. The method can further include an operation of, when the interference is determined to affect the interaction: causing, based on the contextual data, the computing device or another computing device to render a keyboard interface for receiving a user input in furtherance of the interaction between the user and the automated assistant. In some implementations, processing the contextual data that characterizes audio characteristics of the environment in which the computing device is present includes: processing historical interaction data that characterizes one or more prior instances in which the user provided a spoken input to the automated assistant and the automated assistant did not fulfill one or more requests embodied in the spoken input.

We claim:
1. A method implemented by one or more processors, the method comprising:
generating a current embedding in latent space based on processing contextual data using a machine learning model, wherein the contextual data characterizes environmental characteristics of an environment in which a computing device is present, and wherein the computing device provides access to an automated assistant via a plurality of interfaces;

determining a first distance, in the latent space, based on comparing the current embedding to an audio interface modality embedding in the latent space;

determining a second distance, in the latent space, based on comparing the current embedding to a keyboard modality embedding in the latent space;

selecting, based on the first distance and the second distance an audio interface modality or a keyboard interface modality; and causing, based on the selecting, the computing device to render one of an audio interface or keyboard interface for receiving a user input in furtherance of interaction between the user and the automated assistant.

2. The method of claim 1, wherein the contextual data characterizes a context in which a particular application is executing.

3. The method of claim 1, wherein the contextual data characterizes a context in which a particular user is accessing the computing device.

4. The method of claim 1, wherein the contextual data characterizes a context in which a particular user is accessing an application on the computing device.

5. The method of claim 1, wherein the contextual data characterizes a context in which a particular user is accessing another device.

6. The method of claim 1, wherein the machine learning model is trained using training data based on scenarios in which the user is in an environment where multiple devices and/or applications are exhibiting various operating states.

7. A method implemented by one or more processors, the method comprising:

processing contextual data characterizing an environment in which a computing device is present, determining, based on processing the contextual data, a score that reflects a degree to which characteristics of the environment correspond to an interference that is expected to affect an audible interaction between a user and the automated assistant; and when the score indicates that the interference is determined to affect the audible interaction:

causing, based on the contextual data, the computing device to render a keyboard interface for receiving a user input in furtherance of the interaction between the user and the automated assistant, wherein a brightness of rendering of the keyboard interface is based on the degree reflected by the score.

8. The method of claim 7, wherein the contextual data characterizing the environment includes a quantity of persons that are speaking, a source of a particular sound, a volume and/or frequency of the particular sound, overall volume level, and/or a distance of a source of the particular sound to a particular interface.

9. The method of claim 7, wherein the contextual data characterizing the environment includes objects, persons, location, available power, weather, motion, lighting, distance between certain objects, layout of an area, and/or temperatures.

10. The method of claim 7, wherein a size and/or shape of the rendered keyboard interface is also based on the degree reflected by the score.

11. The method of claim 7, further comprising:

when the score indicates that the interference is determined to affect the audible interaction: causing, based on the contextual data, the computing device to render a keyboard interface for receiving a user input in furtherance of the interaction between the user and the automated assistant, and causing, based on the contextual data, the automated assistant to limit detection of one or more assistant commands via one or more additional interfaces.

12. The method of claim 11, further comprising:

disabling or limiting the one or more additional interfaces based on limiting detection of one or more assistant commands via the one or more additional interfaces.

13. The method of claim 11, wherein the contextual data characterizing the environment includes an assistant suppressing output from another device.

14. The method of claim 13, wherein detection of the one or more assistant commands would otherwise invoke the automated assistant if the assistant suppressing output were not included in the contextual data.

15. A method implemented by one or more processors, the method comprising:

processing contextual data characterizing an environment in which a computing device is present, determining, based on processing the contextual data, a score that reflects a degree to which characteristics of the environment correspond to an interference that is expected to affect an audible interaction between a user and the automated assistant; and when the score indicates that the interference is determined to affect the audible interaction:

causing, based on the contextual data, the computing device to render a keyboard interface for receiving a user input in furtherance of the interaction between the user and the automated assistant, wherein a content layout of the keyboard interface is based on the degree reflected by the score.

16. The method of claim 15, wherein a size and/or shape of the rendered keyboard interface is also based on the degree reflected by the score.

17. The method of claim 15, further comprising:

when the score indicates that the interference is determined to affect the audible interaction: causing, based on the contextual data, the computing device to render a keyboard interface for receiving a user input in furtherance of the interaction between the user and the automated assistant, and causing, based on the contextual data, the automated assistant to limit detection of one or more assistant commands via one or more additional interfaces.

18. The method of claim 17, further comprising:

disabling or limiting the one or more additional interfaces based on limiting detection of one or more assistant commands via the one or more additional interfaces.

19. The method of claim 17, wherein the contextual data characterizing the environment includes an assistant suppressing output from another device.

20. The method of claim 19, wherein detection of the one or more assistant commands would otherwise invoke the automated assistant if the assistant suppressing output were not included in the contextual data.

* * * * *